United States Patent
Geiger et al.

(10) Patent No.: US 7,437,804 B1
(45) Date of Patent: Oct. 21, 2008

(54) CLAMP TIE

(75) Inventors: Gerard G. Geiger, Jackson, WI (US); Michael E. Puncochar, Hillsboro, OR (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 11/807,059

(22) Filed: May 25, 2007

(51) Int. Cl.
B65D 63/00 (2006.01)
(52) U.S. Cl. .................................. 24/16 PB; 248/74.3
(58) Field of Classification Search ................ 248/74.3, 248/74.1, 74.2, 68.1, 69; 24/16 PB, 17 A, 24/17 PB
See application file for complete search history.

(56) References Cited

U.S. PATENT DOCUMENTS

| | | |
|---|---|---|
| 1,313,372 A | 8/1919 | Dodge |
| 1,437,144 A | 11/1922 | Isaacson |
| 2,193,291 A | 3/1940 | Marchins |
| 2,945,713 A | 7/1960 | Sears |
| 3,149,808 A | 9/1964 | Weckesser |
| 3,250,505 A | 5/1966 | Rodman, Sr. et al. |
| 3,463,427 A | 8/1969 | Fisher |
| 3,486,725 A | 12/1969 | Hidassy |
| 3,504,937 A | 4/1970 | Ponovic |
| 3,632,069 A | 1/1972 | Thayer et al. |
| 3,632,070 A | 1/1972 | Thayer |
| 3,632,071 A | 1/1972 | Cameron et al. |
| 3,705,708 A | 12/1972 | Cunningham |
| 3,913,876 A | 10/1975 | McSherry |
| 4,037,978 A | 7/1977 | Connelly |
| 4,128,220 A | 12/1978 | McNeel |
| 4,141,116 A | 2/1979 | Zalonis |
| 4,396,329 A | 8/1983 | Wollar |
| 4,552,481 A | 11/1985 | Bluett |
| 4,665,588 A | 5/1987 | Nakano |
| 4,688,961 A | 8/1987 | Shioda et al. |
| 4,705,245 A | 11/1987 | Osada |
| 4,768,741 A | 9/1988 | Logsdon |
| 4,865,281 A | 9/1989 | Wollar |
| 4,910,831 A | 3/1990 | Bingold |
| 4,925,136 A | 5/1990 | Knott |
| 4,936,530 A | 6/1990 | Wollar |
| 4,955,749 A | 9/1990 | Panovic |
| 5,088,158 A | 2/1992 | Burkholder |

(Continued)

FOREIGN PATENT DOCUMENTS

GB 933929 8/1963

(Continued)

Primary Examiner—Ramon O Ramirez
(74) Attorney, Agent, or Firm—Ryan Kromholz & Manion, S.C.

(57) ABSTRACT

A clamp tie includes a locking head and flexible straps extending therefrom. The straps are insertable through the locking head to form spaced loops, which may secure items in a spaced relationship. Pawl mechanisms in the locking head secure the straps in looped configuration. An aperture through the locking head is provided for securing the tie to a mounting structure such as a shouldered mounting stud. An additional pawl mechanism may be provided within the aperture to secure the tie to the stud. Arcuate surfaces extend from the locking head, spaced from the straps, to further engage secured items. The upper and lower surfaces of the locking head have counterbores to receive mounting hardware and provide minimal variance of wall thickness throughout the locking head to reduce cure time and materials required for manufacture.

21 Claims, 3 Drawing Sheets

U.S. PATENT DOCUMENTS

| | | | |
|---|---|---|---|
| 5,224,244 A | 7/1993 | Ikeda et al. | |
| D347,156 S | 5/1994 | Starrett et al. | |
| 5,328,290 A | 7/1994 | Plastina | |
| 5,332,179 A | 7/1994 | Kuffel et al. | |
| 5,337,983 A | 8/1994 | Mailey | |
| 5,386,615 A | 2/1995 | Bernard | |
| 5,398,383 A | 3/1995 | Bingold | |
| 5,538,208 A | 7/1996 | Cordes et al. | |
| 5,636,937 A | 6/1997 | Zemlicka | |
| 5,653,409 A | 8/1997 | White, Jr. et al. | |
| 5,730,399 A | 3/1998 | Baginski | |
| 5,820,048 A | 10/1998 | Shereyk et al. | |
| 5,820,083 A | 10/1998 | Geiger | |
| 5,862,927 A | 1/1999 | Tebeau | |
| 5,884,367 A | 3/1999 | Teagno et al. | |
| 5,966,781 A | 10/1999 | Geiger | |
| 6,151,761 A | 11/2000 | Thompson | |
| 6,196,033 B1 * | 3/2001 | Dowdle | 70/16 |
| 6,196,751 B1 | 3/2001 | Khokhar | |
| 6,240,602 B1 | 6/2001 | Geiger | |
| 6,364,257 B1 * | 4/2002 | Holder | 248/74.3 |
| 6,398,169 B1 | 6/2002 | Streit | |
| 6,532,631 B2 | 3/2003 | Rohaly et al. | |
| 6,533,226 B2 | 3/2003 | Geiger | |
| 6,536,718 B2 | 3/2003 | Benito-Navazo | |
| 6,718,597 B2 | 4/2004 | Geiger | |
| 7,055,783 B2 | 6/2006 | Rosemann et al. | |
| 7,131,168 B2 | 11/2006 | Pangallo | |
| D543,835 S | 6/2007 | Geiger | |
| 2002/0109050 A1 | 8/2002 | Winton, III | |
| 2003/0189140 A1 | 10/2003 | Takeuchi | |
| 2004/0140406 A1 * | 7/2004 | Kanie | 248/73 |

FOREIGN PATENT DOCUMENTS

| | | |
|---|---|---|
| GB | 2129863 | 5/1984 |

* cited by examiner

CLAMP TIE

BACKGROUND OF THE INVENTION

This invention relates generally to devices for securing elongate items, such as wires, cables, hoses, tubing, conduits etc. More particularly, the invention relates to clamp ties that secure such items to a standoff in a spaced relationship to each other.

Various devices have been developed for securing elongate items such as wires, cables, hoses, tubing, conduits, etc. Among these devices are clamps that secure a pair of such items in spaced, parallel relationship with each other. Examples of such clamps are shown in U.S. Pat. No. 5,966,781 and U.S. Pat. No. 6,240,602.

Although effective in securing elongate items to each other, and adapted to slip over a supporting structure, neither of the devices shown in these patents made provision for supporting secured items about a standoff having a shouldered construction. Such need arises, for example, in the trucking, automotive or other industry wherein a pair of hoses, lines or cables are to be spaced from each other and can be mounted to a vehicle frame member on a standoff incorporating lateral protrusions, or a shouldered area, proximate a support surface.

In addition to failing to compensate for shouldered support structures, prior devices had a fairly limited range of object diameters that could be secured thereby. One reason that prior devices were limited to few diameters is because the prior devices maintained an uninterrupted transition from the locking head to the respective straps. In other words, any object supporting structure extending from the locking heads of prior devices limited the range of strap motion, thereby limiting the sizes of elongate articles that could be bundled securely.

Although prior components solved problems associated with predecessor ties, the solutions involved designs incorporating substantial wall thickness, thereby requiring extensive cure time during manufacture and substantial raw materials. Even where proper cure time was provided, the surfaces of the prior devices would exhibit deformations caused by the cooling of the material.

Therefore, the art of bundling elongate objects would benefit from improvements to support structure and strap interfaces while at the same time reducing the amount of materials required and reducing cure time during manufacture.

SUMMARY OF THE INVENTION

The present invention provides a clamp tie, which addresses at least the needs identified above. The clamp tie generally includes a locking head and a plurality of straps depending therefrom. The straps may depend from the same side of the locking head or from different sides. Each strap can form a loop by being turned towards and inserted through an aperture in the locking head. In addition to the straps extending from the locking head, arcuate rails extending from the head, independently from the straps, provide additional clamping surface. A pair of rails, forming a saddle structure, may bridge a single strap or multiple saddle structures could be provided. Pawl mechanisms are disposed in the locking head for engaging and retaining the straps. The locking head further includes a passage for receiving a mounting element therethrough, such as a bolt or a welding stud. The passage may include a pawl mechanism for engaging the mounting element. Even if the mounting element is shouldered near the mounting surface, an embodiment of the tie is adapted to slip over the shouldered area by incorporating a counterbore on the lower surface of the locking head, the counterbore surrounding the passage for receiving the mounting element. The clamp tie may be formed as a single unitary member.

Manufacturing time and materials are also reduced by preferably forming channels in the locking head to maintain a substantially uniform locking head wall thickness. The channels may be formed in any of the locking head surfaces.

DETAILED DESCRIPTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figures 1, 2:
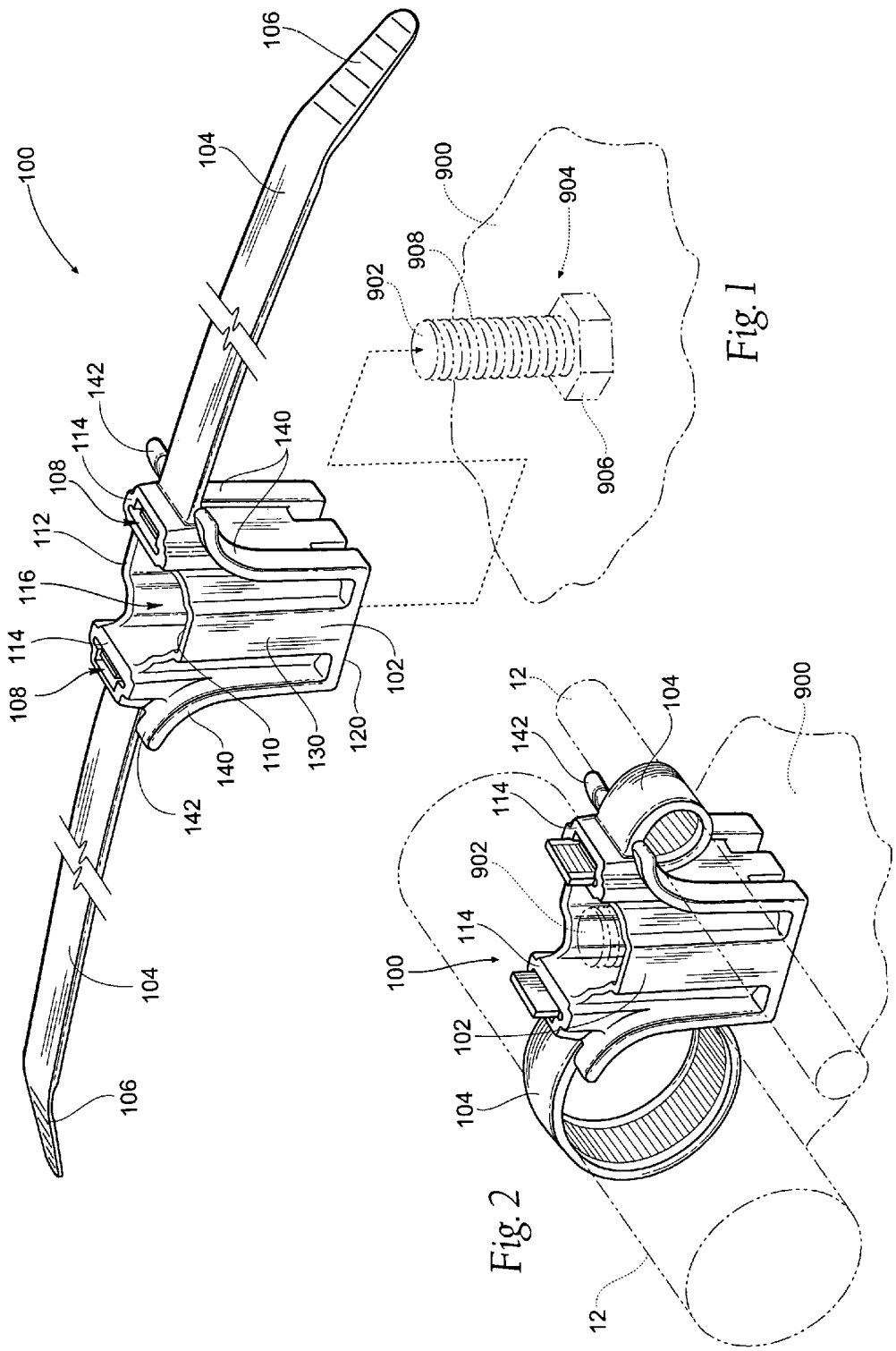
FIG. 1 is a perspective view of an embodiment of a dual spacing clamp tie according to the present invention.
FIG. 2 is a perspective view of the embodiment in FIG. 1 in use.
Figure 3:
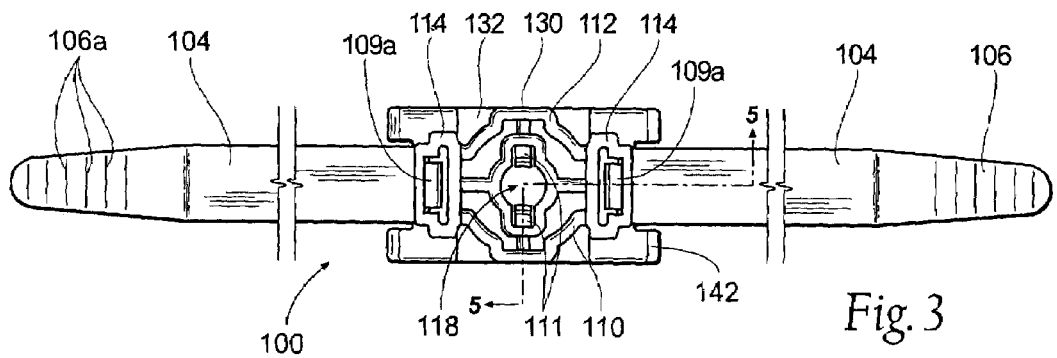
FIG. 3 is a top plan view of the embodiment of FIG. 1.

An embodiment of a clamp tie 100 embodying various features of the present invention is shown in FIG. 1 through FIG. 7. As best seen in FIG. 2, the tie 100 functions to hold elongate items 12 in a spaced relationship. The particular items 12 secured by the tie 100 are not critical and can comprise, wires, cables, tubes, conduits, fiber optics, vines or other such items as well as bundles made up of multiple ones of such items.

Prior to use, the tie 100 appears as shown in FIG. 1, including a locking head 102 and a pair of elongate straps 104 that extend from the locking head 102. The straps 104 are each preferably of substantially uniform width and uniform thickness except at their ends where each tapers into a tie tail portion 106. Spaced slots 108 are formed through the locking head 102. Each slot 108 is shaped and dimensioned to allow the passage of the adjacent strap 104 therethrough. The items 12 to be secured by the tie 100 are secured by looping one of the straps 104 around the item 12 and inserting the strap 104 through an adjacent slot 108 in the locking head 102. The strap 104 is then pulled to tighten it around the items 12. The tail 106 of each strap 104 may include raised portions 106a for providing a gripping surface having greater frictional contact, and the tapered nature of the tail 106 facilitates insertion of the strap 104 through the adjacent slot 108.

Referring further to the Figures, the locking head 102 comprises an upper surface 110, a lower surface 120, a plurality of side surfaces 130 and saddle structures 140 positioned and shaped to lie generally adjacent the items 12 when they are secured by the tie 100.

The upper surface 110 may comprise a relatively planar surface, but it is preferred to have a recessed edge portion 112 between raised portions 114 that surround the slots 108. The upper surface 110 preferably surrounds or forms an upper counterbore 116 extending into the locking head 102 from the upper surface 110. The formation of the counterbore 116 into or depending from the upper surface 110 provides reduced cross section thickness that allows faster processing cycle times than prior art devices. In turn, material requirements are reduced, which leads to cost savings for the manufacturer. Furthermore, the counterbore 116 is preferably sized to allow the use of a socket and ratchet (not shown) to place a nut therein.

The lower surface 120 is preferably relatively planar, except for some preferred lower surface channels 122, which may be included to ensure substantially uniform structure thickness to avoid unnecessary use of materials and unnecessary extended cure time during manufacturing. The lower surface may further surround or form a lower counterbore 124. This lower counterbore 124, as explained further below, adapts the head 102 for use with a mounting element 902 having a shouldered portion 904 such as a nut 906. One or more channels 122 may be formed in conjunction with the counterbore 124. In addition to achieving relatively uniform wall thickness, a channel 122 may be used to prevent rotation of the tie 100 about the mounting element 902 by engaging an anti-rotation structure (not shown) coupled to the mounting element 902 or mounting surface 900.

The side surfaces 130, like the lower surface 120, are preferably relatively planar, except for some preferred side surface channels 132, which may be included to ensure substantially uniform structure thickness to avoid unnecessary use of materials and unnecessary extended cure time during manufacturing. While the side surfaces 130 may be of any desired size, the preferred embodiment 100, as shown, spaces the lower surface 120 from the attachment site of at least one of the straps 104 by at least twice the radius of one or more arcuate rails 142, which are further described below. While not required to practice the present invention, such spacing provides desired standoff elevation from the mounting surface 900. Desired elevation from the mounting surface 900 allows use with a greater range of bundle sizes and separates the bundled items 12 from the surface 900 helping to reduce abrasion and increase capacitance, thereby decreasing likelihood of conductance between a conductive mounting surface 900 and a bundled item 12 carrying electrical current.

Each saddle structure 140 is disposed on or formed integrally with a side surface 130 and preferably comprises two arcuate rails 142 each extending from the locking head 102 and slightly spaced a distance 144 from the strap 104. The rails 142 are curved to generally conform to the circular shape of the loop that is formed when the strap 104 is inserted through the slot 108 and pulled tight against the items 12 to be secured. It will be appreciated that the final diameter of the loop formed by each strap 104 depends on the size of the items 12 to be secured. Thus, in the past, regarding straps including an arcuate structure integral with a strap, the structure had to be shaped to match the anticipated size of the item 12 to be secured. Therefore, many different sizes of ties would be required. However, the saddle structure 140 herein disclosed allows a greater range of item sizes to be used with a given tie 100. As seen particularly in FIG. 2, if a smaller item 12 is secured, the strap 104 is allowed to flex independently of the rails 142, thereby more completely surrounding the smaller item 12.

The straps 104 are coupled to or formed integrally with the locking head 102 proximate the upper surface 110 thereof. The straps have a width 105 and a thickness 107, which may be of any desirable dimensions, keeping in mind the cooperation of the straps 104 with the pawl mechanisms 109. The preferred strap width 105 is generally wider than strap width employed by prior art devices and the preferred thickness 107 is generally thinner than prior art strap thicknesses. A wider width 105 offers several advantages, including performance advantages and ergonomic advantages. An increased width 105 over prior devices improves performance by minimizing crushing or kinking of soft hoses and convoluted tubing by spreading the compression load of the strap 104 across a greater span. Regarding ergonomics, a strap 104 having an increased width 105 provides a wider strap to grab and pull, thereby decreasing the likelihood that a person installing the device 100 will cut himself or herself. While the preferred width 105 of the straps 104 is 12.7 millimeters, the straps 104 may be made any desired width. A thinner thickness 107 over prior art devices provides several advantages, including, like the wider width 105, performance advantages and ergonomic advantages. A thinner strap 104 increases performance by reducing tension stress along the outer surface of the strap 104 when fastened about an object 12, especially in the case of objects 12 having smaller diameters. Reduced tension stress yields better performance over conventional ties that may become brittle when used in cold or dry environments. Regarding ergonomics, a thinner strap 104 is more flexible, thereby requiring less effort to install when pulling the strap 102 through the head 102. While the preferred thickness is 1.4 millimeters, the straps 104 may be made any desired thickness.

Figure 4:
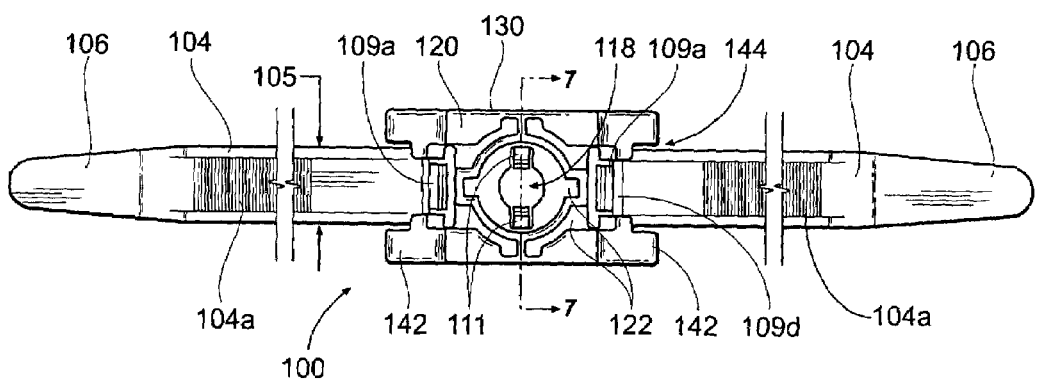
FIG. 4 is a bottom plan view of the embodiment of FIG. 1.
Figure 5:
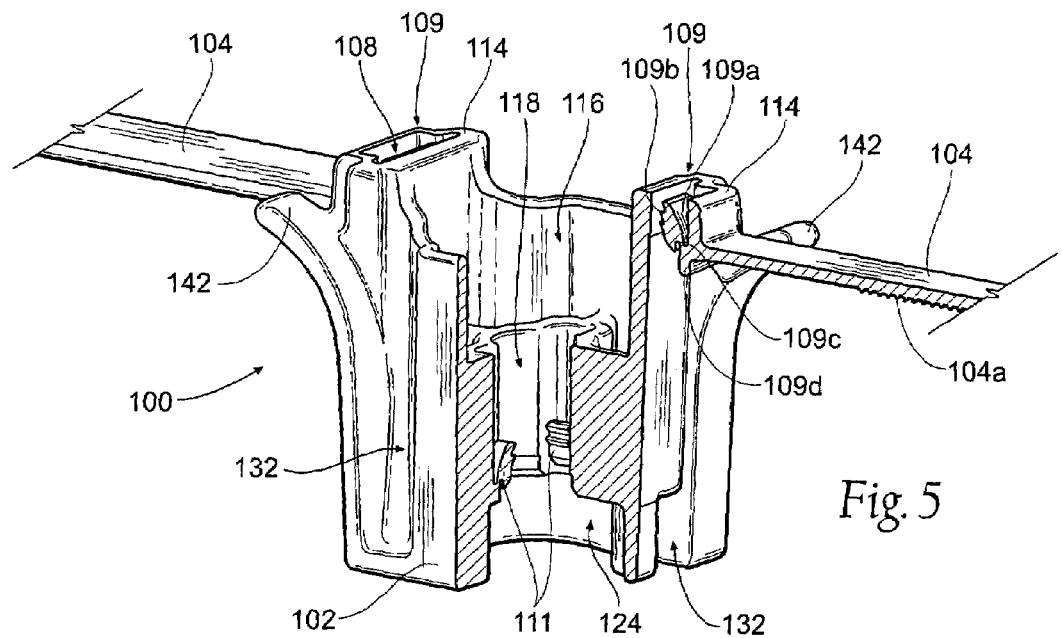
FIG. 5 is a perspective partial cut-away view taken along line 5-5 of FIG. 3.
Figure 6:
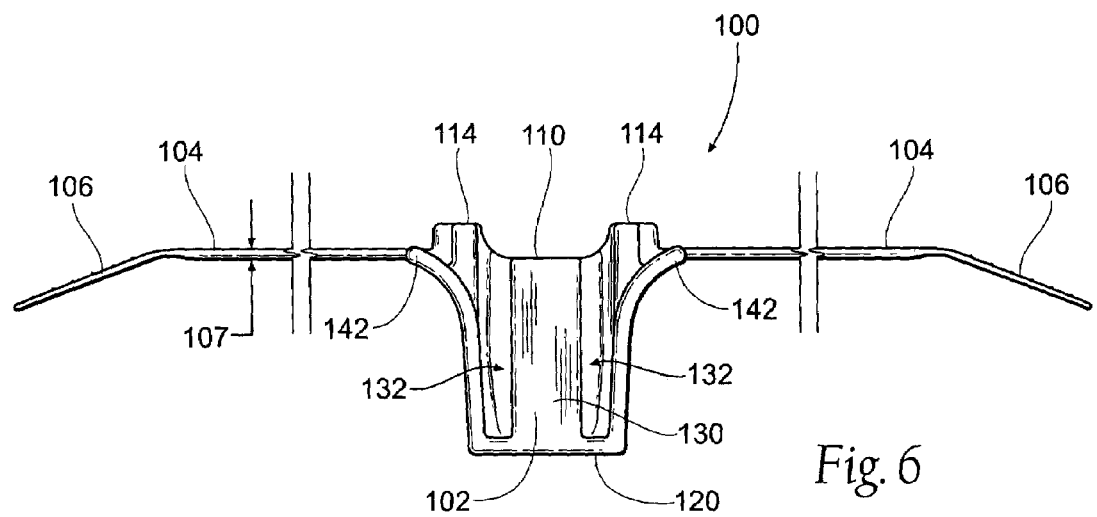
FIG. 6 is a front elevation view of the embodiment of FIG. 1.

In accordance with one aspect of the invention, and as best seen in FIG. 4 and FIG. 5, pawl mechanisms 109 are provided for securing the straps 104 within the locking head 102 and around the items 12 to be secured. As illustrated, each pawl mechanism 109 includes a pawl 109a. A forward surface of each pawl 109a is provided with a plurality of teeth 109b that engage complementary serrations 104a when the strap 104 is looped around the items 12 to be secured and then inserted through the locking head 102.

As illustrated, each pawl 109a is carried at the end of an integrally formed hinge 109c that enables the pawl 109a to pivot relative to the locking head 102. Preferably, the pawls 109a are biased toward the strap 104 to pinch the strap 104 between the pawl 109a and the interior side wall of each slot 108 when the strap 104 is inserted through the slot 108. This helps ensure intimate contact between the teeth 109b of the pawl 109a and the serrations 104a of the strap 104. Preferably, the teeth 109b of the pawl 109a and the serrations 104a on the strap 104 are ramped as shown. The ramped surfaces thus formed push the pawl 109a away from the strap 104 as the strap 104 is inserted through the slot 108 to facilitate insertion of the strap 104 through the slot 108. Withdrawing movement of the strap 104 relative to the slot 108, however, pulls the pawl 109a into stronger engagement with the serrations 104a of the strap 104 to resist such withdrawing movement and thereby secure the strap 104 within the slot 108 and around the items 12 to be secured. The pawl mechanism 109 may further include a reinforcement rib 109d provided adjacent the pawl hinge 109c to increase the circumferential hoop strength of a loop formed by the strap 104 in cooperation with the pawl mechanism 109. The increased hoop strength is particularly advantageous in environments where the objects 12 bundled by the tie 100 may twist relative to any supporting structure.

Figure 7:
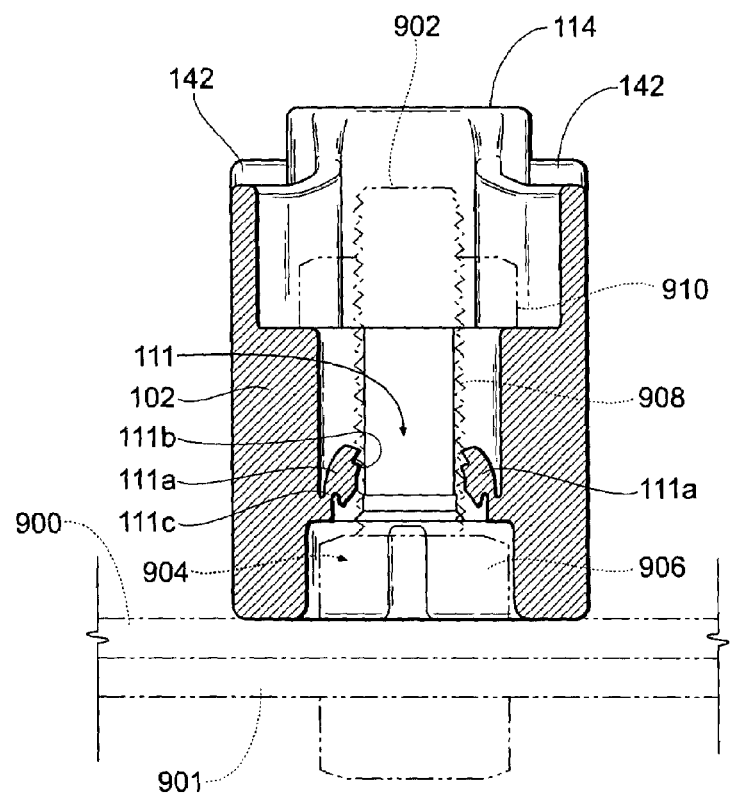
FIG. 7 is a cross-section view taken along line 7-7 of FIG. 4.

The tie 100, in addition to securing items 12 to each other, can also function to secure the items 12 proximate a panel or similar mounting surface 900 about a mounting element 902, such as a support stud. To this end, the locking head 102 preferably includes a central aperture 118 extending through the locking head 102 between the slots 108. As best seen in FIG. 2 and FIG. 7, the central aperture 118 permits the mounting element 902 to extend through the locking head 102. The mounting element 902 may be welded to the underlying support or mounting surface 900 such as, for example, a frame rail in a truck or other vehicle. The diameter or span of the central aperture 118 may be slightly smaller than that of the element 902 so that frictional engagement with the element 902 keeps the tie 100 firmly in place and proximate the mounting surface 900. As further shown in FIG. 5, the central aperture 118 is preferably flared at least one end and is of substantially uniform diameter. As an example, a diameter of the aperture 118 approximately five percent smaller than the diameter of the mounting element 902 has been found sufficient to maintain the head 102 in place. Friction between the interior side walls of the aperture 118 and the mounting element 902 may be sufficient to keep the tie 100 in place on the mounting element 902.

Alternatively, a mechanical self retaining feature of the device 100 could be used on a threaded or notched mounting element 902. In this case, the central aperture 118 is of sufficient size to easily pass over the mounting element 902. A third pawl mechanism 111 is provided in the aperture 118 for engaging the mounting element 902 and retaining the tie 100 on the mounting element 902. The third pawl mechanism 111, which is best seen in FIG. 7, includes a pair of pawls 111a positioned diametrically opposite each other across the aperture 118. A forward surface of each pawl 111a is provided with a plurality of teeth 111b that engage the threads or notches 908 of the mounting element 902 when it is inserted through the locking head 102. As illustrated, each pawl 111a is carried at the end of an integrally formed hinge 111c that enables the pawl 111a to pivot relative to the locking head 102. Preferably, the pawls 111a are biased at least slightly toward each other when the mounting element 902 is not present in the aperture 118. This helps ensure intimate contact between the teeth 111b of the pawl 111a and the threads 908 of the mounting element 902. Preferably, the teeth 111b of the pawl 111a are ramped as shown. The ramped surfaces thus formed push the pawl 111a away from the mounting element 902 as the element 902 is inserted through the head 102 to facilitate insertion. Withdrawing movement of the head 102 relative to the mounting surface 900, however, pulls the pawls 111a into stronger engagement with the threads 908 of the mounting element 902 to resist such withdrawing movement and thereby secure the head 102 to the mounting element 902 proximate the mounting surface 900.

Furthermore, the lower counterbore 124 formed in or depending from the lower surface 120 of the head adapts the head 102 for use with a mounting element 902 having a shouldered portion 904 such as a nut 906. As seen particularly in FIG. 7, the mounting element 902 may be a threaded element, the primary purpose of which may be to maintain a first panel 900 coupled to a second panel 901. To that end, a nut 906 is threaded onto the mounting element 902, thereby creating a shouldered portion 904 near the mounting surface 900. Depending upon the length of the mounting element 902 extending above the shouldered portion 904, the tie head 102 may not be properly supported. Indeed, absent a lower counterbore 124, the third pawl mechanism 111 may not serve its intended purpose or even engage a shorter element 902 at all. The lower counterbore 124 alleviates some dependency on the length of the mounting element 902. That is, appropriately sized, the lower counterbore 124 allows the lower surface 120 to rest against the mounting surface 900, thereby providing a more stable support for the head 102. Not only does the counterbore 124 cause the lower surface 120 of the locking head 102 to rest nearer the mounting surface 900, but the counterbore 124 further allows the third pawl mechanism 111 to engage the mounting element 902 closer to the shouldered portion 904 than if the bottom surface 120 was completely flat.

If desired, rather than relying solely on frictional or mechanical engagement between the head 102 and the mounting element 902, an additional fastener, such as a nut 910 represented in FIG. 7, can be used with the tie 100 to effect a more secure attachment between the tie 100 and the mounting surface 900. If the mounting element 902 is threaded, a threaded nut 910 may be used; if smooth, a push nut (not shown) may be used.

Preferably, the clamp tie 100 comprises a single, unitary element that is economically injection molded from a suitable thermoplastic material using known fabrication techniques. It will be appreciated that the size and shape of the tie 100 can be modified to suit particular items 12 and applications. In particular, it will be appreciated that the distance between articles 12 can be selected to maintain a desired fixed spacing. Additionally, the dimension between the upper surface 110 and lower surface 120 of the locking head 102 can be selected to provide a desired clearance for the secured articles 12 relative to the mounting surface 900. Accordingly, it will be appreciated that the particular design features of the embodiment shown and described are meant to be illustrative rather than limiting.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A clamp tie comprising:
   a locking head including first and second spaced apertures, a third aperture for receiving a mounting element therethrough and an upper surface, a lower surface comprising a lower surface counterbore surrounding said third aperture and a plurality of channels, a plurality of side surfaces coupled to and disposed between said upper surface and said lower surface,
   a first strap extending from said locking head, said first strap having a first strap thickness and a first strap width, said first strap width disposed between first strap first and second sides,
   a second strap extending from said locking head, said second strap having a second strap thickness and a second strap width, said second strap width disposed between second strap first and second sides,
   a first arcuate rail extending from said locking head substantially parallel to and spaced from said first strap first side,
   a second arcuate rail extending from said locking head substantially parallel to and spaced from said first strap second side,
   a first pawl mechanism cooperating with said first aperture for engaging and retaining said first strap,
   a second pawl mechanism cooperating with said second aperture for engaging and retaining said second strap, and
   said first strap and said first and second arcuate rails extending from a first side surface and said second strap extending from a second side surface.

2. A clamp tie according to claim 1 wherein said first and second apertures each have an entrance and an exit, each entrance aperture having a strap side and a body side, said first pawl mechanism further comprising a first reinforcement rib disposed at least partially along said first aperture entrance strap side, said second pawl mechanism further comprising a second reinforcement rib disposed at least partially along said second aperture entrance strap side.

3. A clamp tie according to claim 1, said clamp tie comprising a unitary member.

4. A clamp tie according to claim 1 wherein the first strap width and second strap width are equal.

5. A clamp tie according to claim 1 wherein said first strap thickness and second strap thickness are equal.

6. A clamp tie according to claim 1 further comprising:
a third arcuate rail extending from said locking head substantially parallel to and spaced from said second strap first side, and
a fourth arcuate rail extending from said locking head substantially parallel to and spaced from said second strap second side.

7. A clamp tie according to claim 1 wherein said first arcuate rail has a radius and said upper surface and said lower surface are spaced a distance, said distance being greater than said radius of said first arcuate rail.

8. A clamp tie according to claim 7 wherein said distance is greater than twice said radius of said first arcuate rail.

9. A clamp tie according to claim 1 wherein said first and second side surfaces are disposed substantially 180 angular degrees about said locking head.

10. A clamp tie according to claim 1 wherein said upper surface comprises an upper surface counterbore surrounding said third aperture.

11. A clamp tie according to claim 10 wherein said upper surface counterbore comprises a plurality of channels.

12. A clamp tie according to claim 1 wherein one of said channels is mateable with a surface on or near said mounting element to prevent rotation of the tie about said mounting element.

13. A clamp tie according to claim 1 further comprising a third pawl mechanism, said third pawl mechanism located within said third aperture.

14. A clamp tie comprising
a unitary member including;
a single locking head including a pair of laterally spaced apertures, a third aperture for receiving a mounting element therethrough, said third aperture located between said pair of laterally spaced apertures, an upper surface, a lower surface comprising a lower surface counterbore surrounding said third aperture and a plurality of channels, a plurality of side surfaces coupled to and disposed between said upper surface and said lower surface,
a pair of straps extending in opposite directions from the locking head,
a first saddle structure coupled to and extending from said locking head adjacent one of the straps,
a second saddle structure coupled to and extending from said locking head adjacent the other of the straps, said first and second saddle structures each comprising two arcuate rail members, one disposed on each side of said first and second straps, respectively,
a first pawl mechanism contained within one of said locking head apertures for engaging and retaining one of the straps,
a second pawl mechanism contained within the other of said locking head apertures for engaging and retaining the other of the straps, and
said first strap and said first and second arcuate rails extending from a first side surface and said second strap extending from a second side surface.

15. A clamp tie according to claim 14 further comprising a third pawl mechanism, said third pawl mechanism located within said third aperture.

16. A clamp tie according to claim 15 wherein said third pawl mechanism includes a pair of opposed pawls located substantially opposite one another within said aperture.

17. A clamp tie according to claim 14 wherein the diameter of the third aperture is smaller than the diameter of a predetermined mounting element.

18. A clamp tie for securing elongate items adjacent a mounting surface in spaced, substantially parallel relationship to each other, comprising:
a locking head having an aperture for receiving therethrough a mounting element and an upper surface, a lower surface comprising a lower surface counterbore surrounding said third aperture and a plurality of channels, a plurality of side surfaces coupled to and disposed between said upper surface and said lower surface,
a pair of straps extending in opposite directions from said locking head and insertable through said locking head to form a loop,
two pairs of arcuate rails extending from said locking head, one pair being adjacent to but separate from each of said straps,
a first pawl mechanism within said locking head for engaging and retaining one of said straps in looped relationship with said locking head and one said pair of arcuate rails,
a second pawl mechanism within said locking head for engaging and retaining the other of said straps in looped relationship with said locking head and the other of said pair of arcuate rails,
a third pawl mechanism within said aperture for engaging and retaining said locking head proximate said mounting surface, and
said first strap and said first and second arcuate rails extending from a first side surface and said second strap extending from a second side surface.

19. A clamp tie according to claim 18 wherein said third pawl mechanism permits movement of said mounting element through said aperture in a first direction but resists movement of said mounting element through said aperture in a second direction.

20. A clamp tie according to claim 19 wherein said third pawl mechanism includes a pair of substantially diametrically opposed pawls, each pawl carried by an elongate hinge within said aperture.

21. A clamp tie according to claim 20 wherein said tie comprises a single unitary structure.

* * * * *